US 6,568,494 B2

(12) United States Patent  (10) Patent No.: US 6,568,494 B2
Takahashi  (45) Date of Patent: May 27, 2003

(54) COOLING STRUCTURE OF MOTOR-ASSIST DEVICE FOR VEHICLE

(75) Inventor: Daisaku Takahashi, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 09/951,396

(22) Filed: Sep. 14, 2001

(65) Prior Publication Data
US 2002/0035973 A1 Mar. 28, 2002

(30) Foreign Application Priority Data

Sep. 26, 2000 (JP) ........................................ 2000-292363

(51) Int. Cl.[7] .............................. B60K 11/04; F28F 9/00
(52) U.S. Cl. .......................... 180/68.4; 165/41; 165/51; 180/65.2
(58) Field of Search ................ 180/68.4, 68.6, 180/65.1, 68.2; 165/41, 51; 296/195

(56) References Cited

U.S. PATENT DOCUMENTS

| 4,850,638 | A | * | 7/1989 | Vollrath et al. ............. 296/187 |
| 5,255,733 | A | * | 10/1993 | King ........................... 165/299 |
| 5,609,004 | A | * | 3/1997 | Kreis ......................... 52/655.1 |
| 5,860,685 | A | * | 1/1999 | Horney et al. ............... 293/113 |
| 6,276,477 | B1 | * | 8/2001 | Ida ............................. 180/89.1 |
| 6,323,613 | B1 | * | 11/2001 | Hara et al. .................. 318/471 |
| 6,357,541 | B1 | * | 3/2002 | Matsuda et al. ........... 180/68.2 |
| 6,443,253 | B1 | * | 9/2002 | Whitehead et al. ........ 180/68.1 |

FOREIGN PATENT DOCUMENTS

JP          62-255266        11/1987

\* cited by examiner

Primary Examiner—Brian L. Johnson
(74) Attorney, Agent, or Firm—Nath & Associates PLLC; Gary M. Nath; Marvin C. Berkowitz

(57) ABSTRACT

A first cooling system is formed in a motor-assist device for a vehicle such that a motor housing including a motor is provided with a cooling path communicating with a cooling path in an engine, and the former cooling path is connected to a radiator, a water pump and the engine in that order. A second cooling system for cooling an inverter, which is separate from the first cooling system, is provided in the rear of the vehicle. The second cooling system includes a water pump and a radiator mounted on a lateral rod brace. Accordingly, the size of the second cooling system can be determined based on the amount of heat generated only in the inverter.

5 Claims, 7 Drawing Sheets

COOLING STRUCTURE OF MOTOR-ASSIST DEVICE FOR VEHICLE

BACKGROUND OF THE INVENTION

1. Field of the Invention

The present invention relates to a cooling structure of a motor-assist device for a vehicle, in which a motor control device (inverter) connected to a motor of the motor-assist device for driving a vehicle is cooled by a cooling system separate from the cooling system of the motor-assist device.

2. Description of the Related Art

Recently, hybrid cars have been developed in order to avoid environmental pollution due to exhaust gases. These cars have an engine and a motor/generator, and both or either of which is actuated to drive the vehicle as needed.

The above motor/generator functions as a generator by subjecting a driving shaft of the motor to a torque applied from the wheels and the generated power is stored in a battery via an inverter during braking of the vehicle. On the other hand, during driving of the vehicle, the electric power in the battery is converted to three-phase AC power by the inverter. The AC power is supplied to the motor/generator, so that the motor/generator functions as a motor and is actuated to drive the vehicle.

The motor/generator is interposed between the engine and the transmission which are mounted in the front of the vehicle. The inverter for converting direct current into alternating current, which is connected to the motor/generator, is mounted in the rear of the vehicle when there is no mounting space in the front of the vehicle. Since the inverter generates heat due to the flow of current, the inverter is provided with a cooling system for facilitating the heat radiation.

The conventional cooling system of the inverter is provided with an inverter-cooling pipe in which a cooling path in the engine mounted in the front of the vehicle branches off from a heat exchanger to the inverter and circulates therethrough. The cooling pipe has a water pump interposed therein and is filled with a cooling liquid such as water. The cooling liquid is allowed to circulate by actuating the water pump and the heat radiates from the heat exchanger (disclosed in Japanese Patent Laid-open No. Sho 62-255266).

In the above-described conventional art, when cooling water of the engine is used to cool the inverter, there is a problem such that the cooling pipe in the inverter-cooling system becomes long depending on the position at which the inverter is mounted. Also, it is difficult to control the temperature of the water, which is required by the inverter, due to the temperature of the engine.

Furthermore, when the cooling water of the engine and the cooling liquid of the inverter are allowed to flow through a different cooling path, arrangement of parts, such as the pump for circulating the cooling liquid, the radiator for facilitating the heat radiation, and a cooling pipe, in the vehicle may be difficult because of the constraints of the parts of a rear-wheel drive and suspension system and an exhaust system.

SUMMARY OF THE INVENTION

The present invention is made in consideration of the above problems. Accordingly, it is an object of the present invention to provide a cooling structure of a motor-assist device for a vehicle in which a second cooling system for cooling a motor control device, which is separate from an engine-cooling system, is provided so as to shorten a cooling pipe, and in which a radiator is disposed inside a rear bumper, thereby circumventing constraints in the arrangement of the cooling parts and facilitating control of the water temperature.

In order to achieve the above object, according to the present invention, there is provided a cooling structure of a motor-assist device for a vehicle in which a motor housing including a motor connected to a motor control device is disposed between an engine and a transmission which are mounted in the vehicle, and in which the motor-assist device for the vehicle is cooled by a first cooling system, wherein the first cooling system for cooling the motor-assist device for the vehicle is formed in such a manner that a cooling path is formed in the motor housing, an inlet of the cooling path is connected with a heat exchanger, and a heat exchanger and a water pump driven by the engine are connected with each other, and wherein the motor control device is mounted in the rear of the vehicle and a second cooling system for cooling the motor control device is provided separately from the first cooling system.

According to the present invention, the second cooling system which is separate from the first cooling system (assist-cooling system) is provided to cool the motor control device mounted in the rear of the vehicle, and the size of the second cooling system can be determined based on the amount of heat generated only in the motor control device (inverter).

In the present invention, preferably, the second cooling system for cooling the motor control device comprises a water pump and a radiator secured to a suspension system of the vehicle.

According to the present invention, since the radiator forming the second cooling system is secured to the high-strength suspension system of the vehicle, there is no need to provide another mounting member for mounting the radiator.

In the present invention, preferably, the suspension system of the vehicle is a lateral rod brace.

According to the present invention, the radiator is mounted in the vicinity of one end of the lateral rod brace. This eliminates the need for a high-strength bracket for retaining the radiator, so that the bracket with a simple structure can be manufactured. Also, the radiator is mounted in the vicinity (vehicle-body side) of one end of the lateral rod brace, thereby decreasing the length of a pipe connecting the radiator with the water pump secured to the vehicle body.

In the present invention, preferably, a part of the radiator forming the second cooling system for cooling the motor control device is covered with a rear bumper, and the area covered with the rear bumper is larger than the area that is not covered.

According to the present invention, most of the radiator is covered with the rear bumper, thereby protecting the radiator from external factors (bouncing stones, external forces applied from the rear of the vehicle, or the like).

In the present invention, preferably, an opening is provided at a part of the rear bumper which covers the radiator, and is covered with a mesh.

According to the present invention, the opening is formed at a part of the rear bumper which covers the radiator, so that the performance of the radiator and the cooling performance of the entire system can be improved. Also, the opening is provided with the mesh so as to protect the radiator.

DESCRIPTION OF THE PREFERRED EMBODIMENTS

An embodiment of the present invention will be described hereinbelow with reference to FIG. 1 which schematically shows the essential parts.

Figure 1:
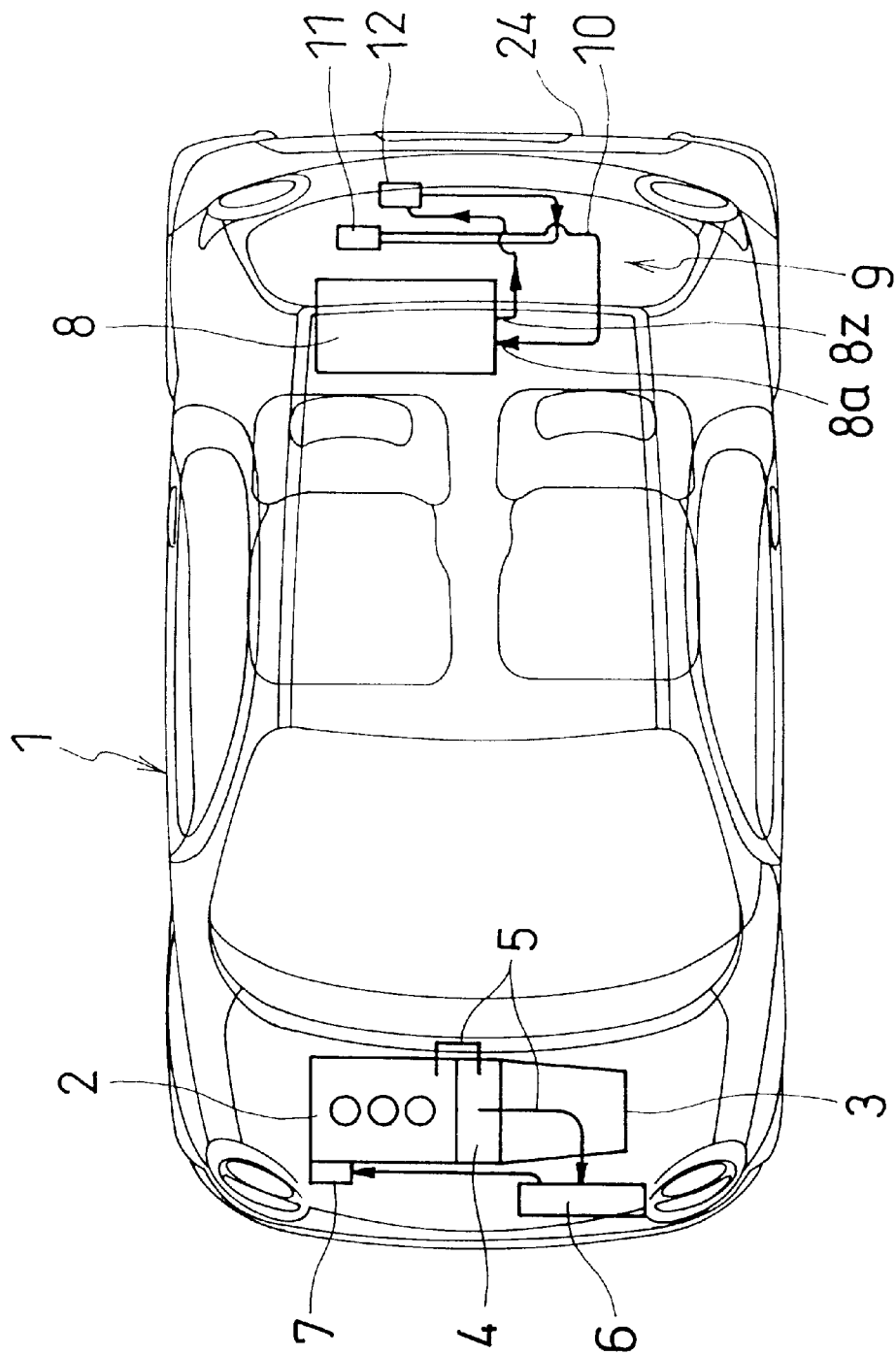
FIG. 1 is a schematic top view of essential parts of an embodiment according to the present invention.

FIG. 1 is a top view of a cooling structure of a motor-assist device for a vehicle according to the present invention. The cooling structure is described as follows. An engine 2 mounted in the front of a vehicle 1 has a transmission 3 connected thereto. A motor housing 4 having a motor (not shown) of the motor-assist device is interposed between the engine 2 and the transmission 3. The motor housing 4 has a cooling path 5, which communicates with an engine-cooling path (not shown) provided in the engine 2.

An inlet of the cooling path 5 provided in the motor housing 4 connects to a radiator 6 that is a heat exchanger. The radiator 6 connects to a water pump 7 driven by the engine 2. The water pump 7 communicates with the engine-cooling path. A first cooling system for cooling the motor-assist device for the vehicle is constructed by such a connection, wherein, when the engine 2 is actuated, cooling water in the cooling path 5 circulates in the motor housing 4, the engine 2, and the like, and cools them.

On the other hand, a motor control device (hereinafter, referred to as an inverter 8) connected to the motor of the motor-assist device for a vehicle is mounted in the rear of the vehicle 1. The inverter 8 has a second cooling system 9 for cooling a heat-generating part of the inverter 8, as shown in the exploded view in FIG. 2. The second cooling system 9 is separate from the first cooling system in the motor-assist device for the vehicle. The second cooling system 9 is constructed of a cooling-water path (not shown) in the inverter 8, a cooling-water pipe 10 connected thereto, a water pump 11, and a radiator 12 for the inverter 8.

Specifically, an inlet 8a of the cooling-water path provided in the inverter 8 and an outlet 11z of the water pump 11 are connected together by the cooling-water pipe 10. An outlet 8z of the cooling-water path in the inverter 8 and an inlet 12a of the radiator 12 are connected together by the cooling-water pipe 10. Furthermore, an outlet 12z of the radiator 12 and an inlet 11a of the water pump 11 are connected together by the cooling-water pipe 10. Thus, the cooling-water pipe 10 and the cooling-water path in the inverter 8 communicate with each other. Therefore, when the water pump 11 is activated while the cooling-water path and the cooling-water pipe 10 are filled with water, the water circulates through the water pump 11, the inverter 8, the radiator 12, and the water pump 11 again. By such a circulation, the heat-generating part of the inverter 8 is cooled down.

Figure 3:
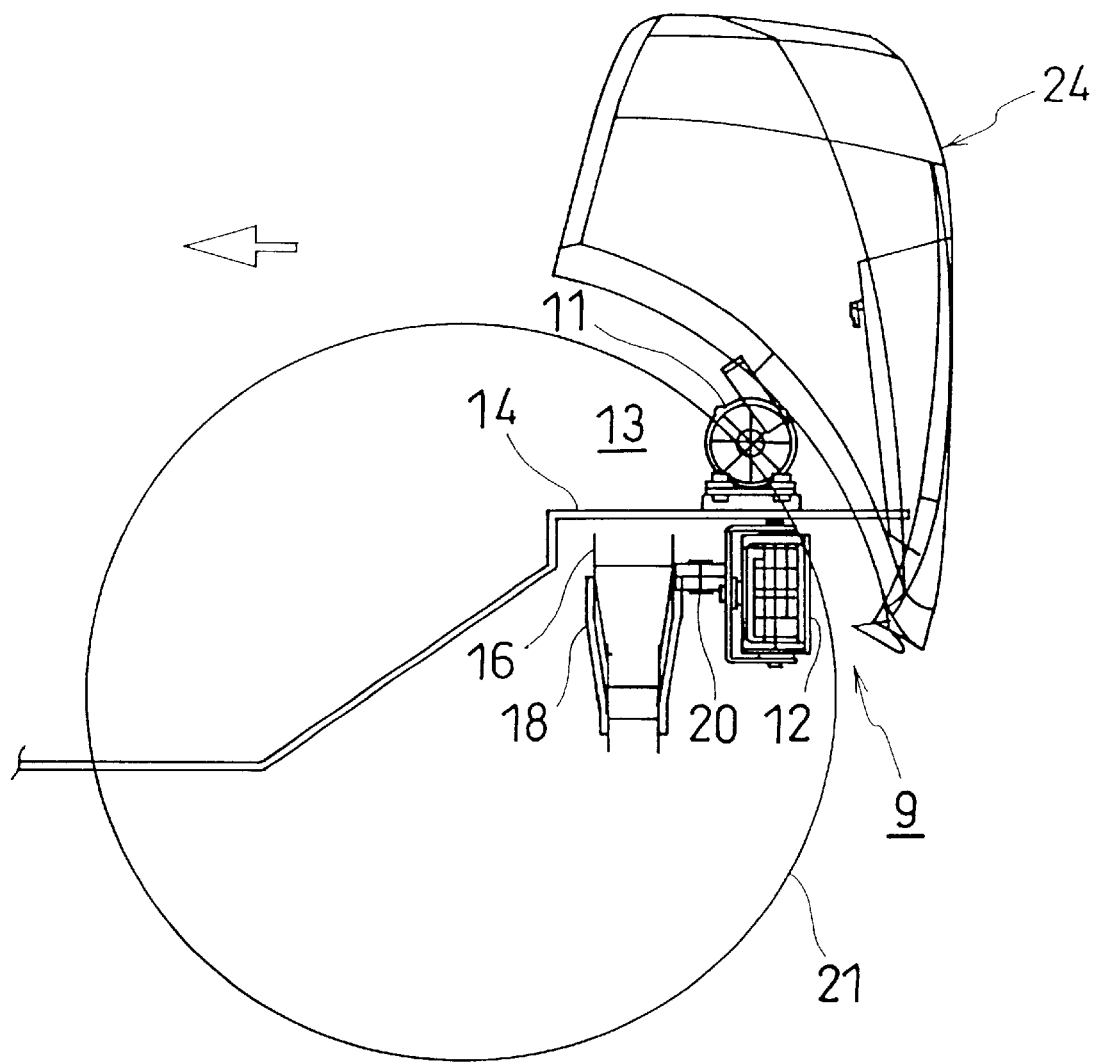
FIG. 3 is a side view showing a state in which the second cooling system of the inverter shown in FIG. 2 is mounted.
Figure 4:
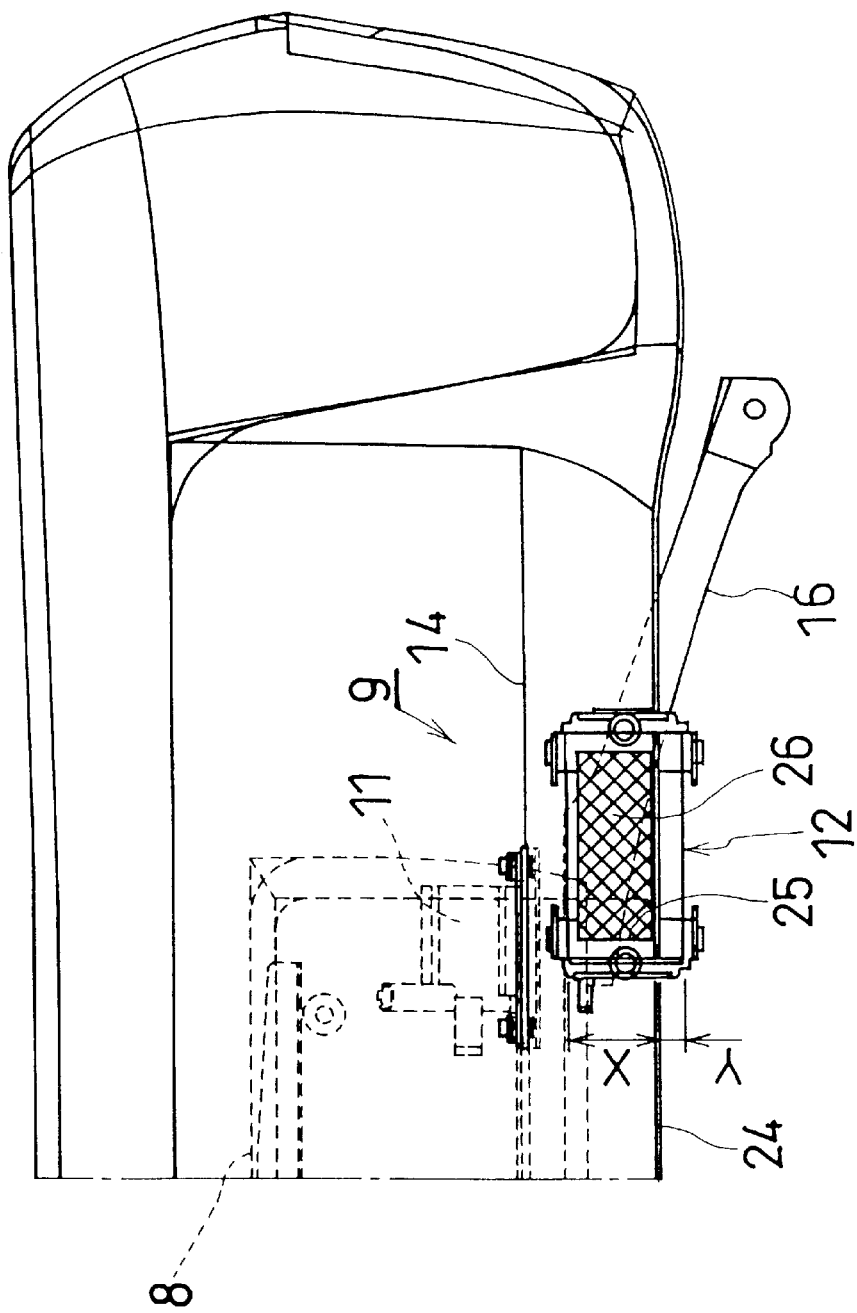
FIG. 4 is a partial schematic view of the parts shown in FIG. 1, which are seen from the rear.
Figure 5:
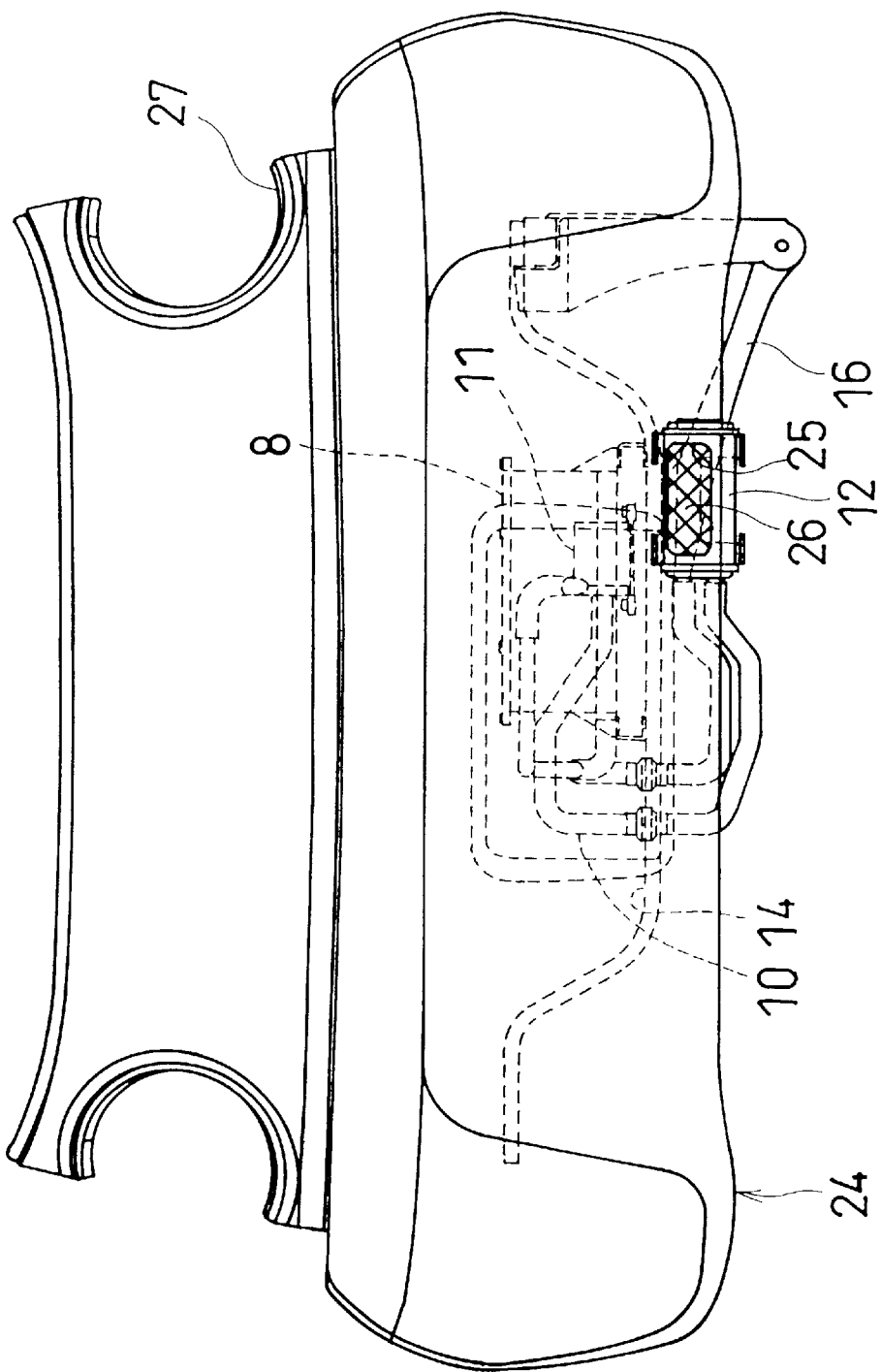
FIG. 5 is a schematic view of the parts shown in FIG. 1, which are seen from the rear.

The inverter 8 and the water pump 11 in the second cooling system 9 are placed on an under floor 14 of a trunk 13 in the rear of the vehicle, as shown in FIGS. 3 to 5 (the inverter 8 is not shown in FIG. 3). The radiator 12 is disposed on the outside of the rear chamber of the vehicle. More specifically, as shown in FIG. 3, the radiator 12 is secured to a lateral rod brace 16 of a lateral rod 15 (not shown in FIG. 3) which forms a suspension system of the vehicle.

Figure 6:
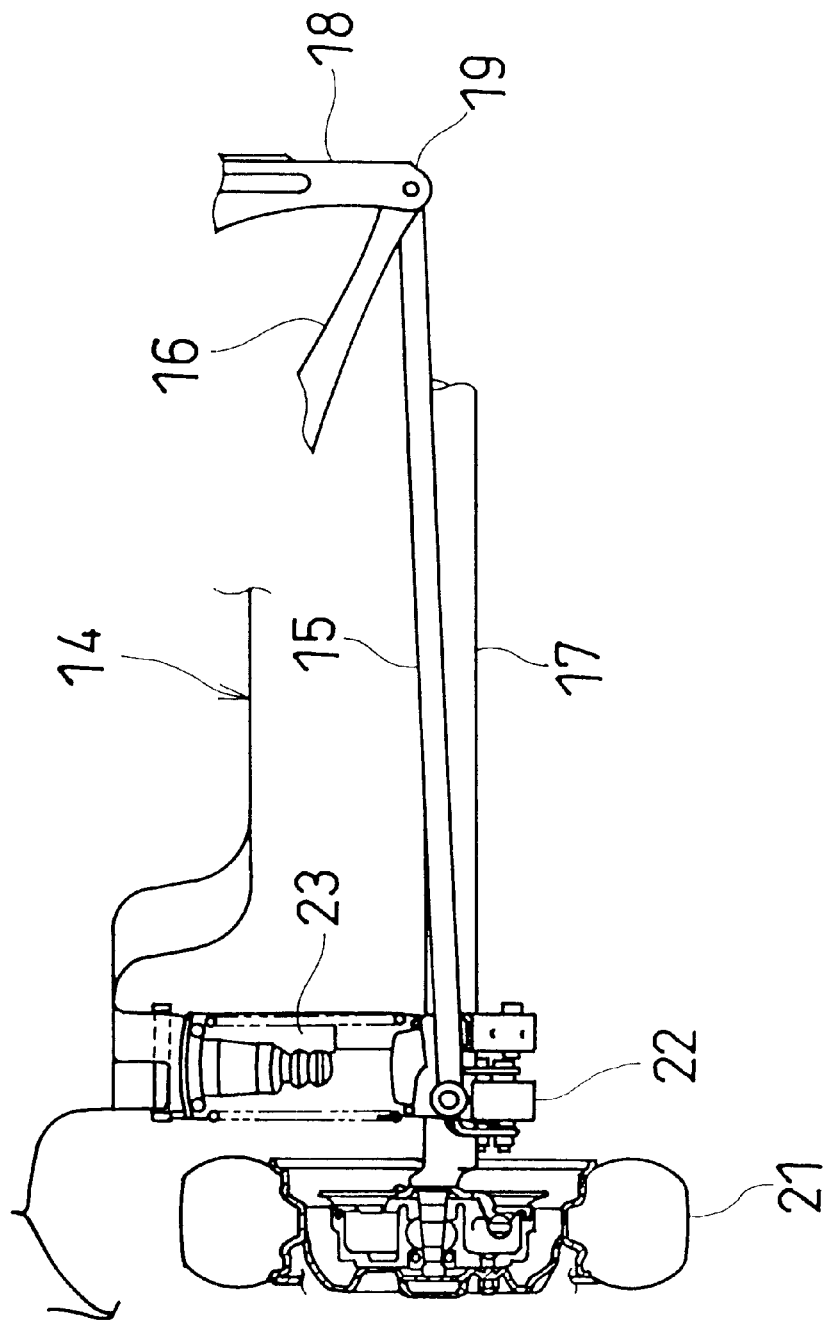
FIG. 6 is a schematic view of the rear of the vehicle body seen from the rear, which shows a state in which a lateral rod brace for mounting a radiator is mounted.
Figure 7:
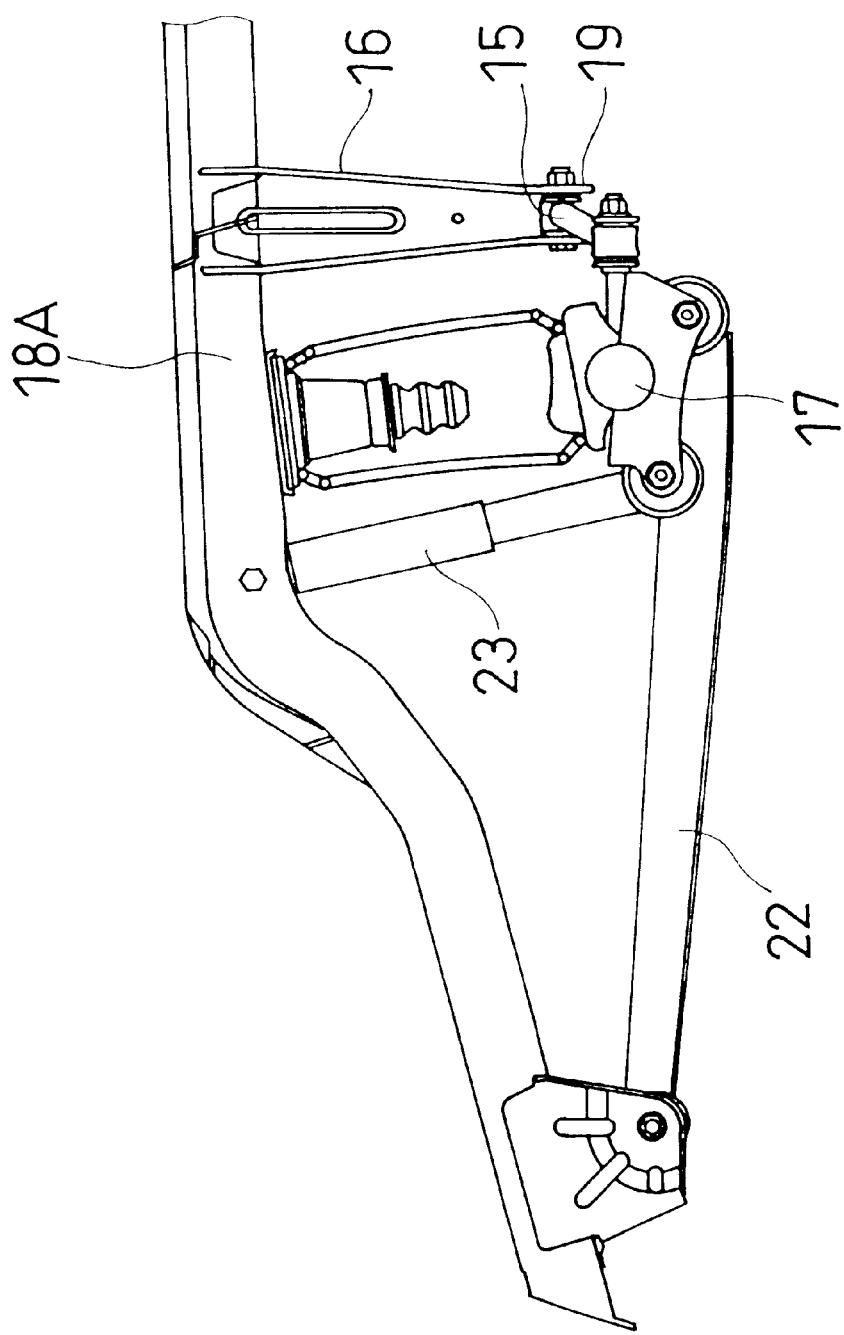
FIG. 7 is a side view of the parts shown in FIG. 6, which are seen from the left.

The lateral rod 15 is laterally arranged between one side of a rear axle 17 and a lateral-rod mounting bracket 18 secured to a vehicle body 18A in order to laterally position the rear axle 17, as shown in FIGS. 6 and 7. The lateral rod brace 16 is a prop having a U-like configuration in cross section, which is arranged slantwise between a retaining section 19 and the vehicle body 18A in order to retain the lateral rod 15 and to ensure the strength of the retaining section 19. In FIGS. 6 and 7, reference numerals 21, 22 and 23 indicate a rear wheel, a trailing link and a rear shock absorber, respectively.

The radiator 12 is secured to a rear part of the lateral rod brace 16, that is, on a rear bumper 24 side via a bracket 20 by welding or by bolts. Since the lateral rod brace 16 has a U-like configuration in cross section as described above, the strength thereof can be ensured. By fixing radiator 12 to a side face of lateral rod brace 16 with bracket 20 (see FIG. 3) that protrudes therefrom, even when a force couple occurring on radiator 12 acts on lateral rod brace 16, lateral rod brace 16 is not deformed and radiator 12 is tightly retained.

A part of the radiator 12 is positioned inside a rear bumper 24 by mounting the radiator 12 at the rear part of the lateral rod brace 16. Accordingly, the upper part of the radiator 12 is covered with the rear bumper 24. Specifically, when the distance from the vertically lower end of the rear bumper 24, which is covered with the rear bumper 24, is X, and the distance that protrudes from the rear bumper 24 is Y, as shown in FIG. 4, X>Y is obtained, wherein the area of the distance X of the radiator 12, which is covered with the rear bumper 24, is larger than the area of the distance Y which is not covered.

When the radiator 12 is covered with the rear bumper 24, as described above, most of the radiator 12 can be protected from external forces exerted from the right rear by the rear bumper 24. However, since cooling performance is decreased in such a state, an opening (hole) 25 is provided in the rear bumper 24, and a mesh 26 is provided on the opening 25. Thus, the radiator 12 is protected so that the external forces applied from the rear are not directly exerted thereto, and also, a decrease in cooling performance can be avoided.

The radiator 12 is positioned at a height at which it is covered with the rear bumper 24, so that the mounting position of the radiator 12 is close to the under floor 14. Accordingly, the piping distance between the radiator 12 and the other connecting members (for example, the water pump 11) mounted in the vehicle is reduced, thereby simplifying the piping. Reference numeral 27 in FIG. 5 denotes a lamp-mounting section.

In the above configuration, since the first cooling system is mounted in the front of the vehicle 1 to cool the motor-assist device for the vehicle, when the engine 2 is activated, the cooling water circulates through the engine 2, the motor housing 4, the radiator 6 and the water pump 7 in that order by the water pump 7 driven by the engine 2.

Figure 2:
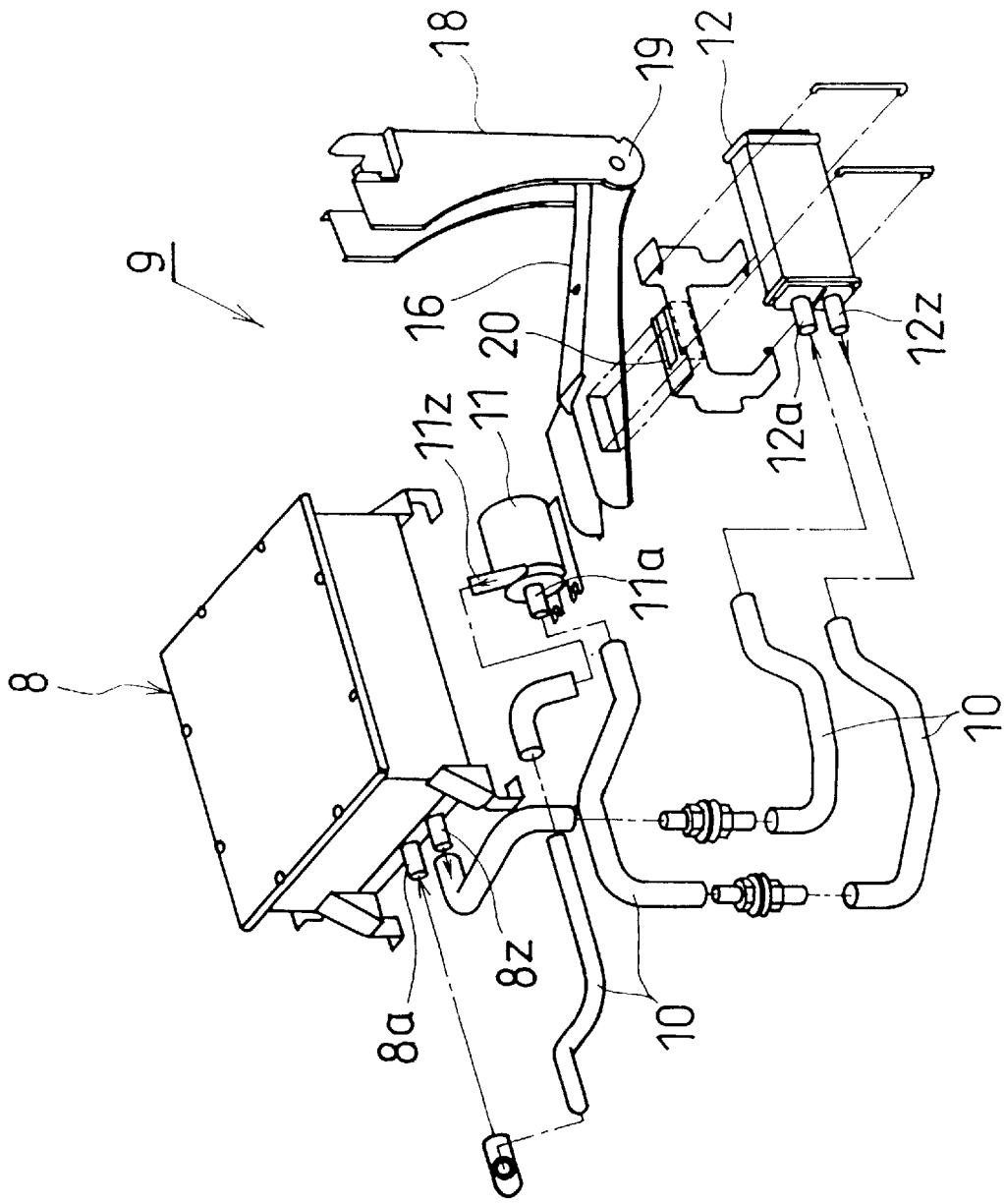
FIG. 2 is an exploded perspective view of a second cooling system of an inverter mounted in the rear of a vehicle body shown in FIG. 1.

Also, the inverter 8 that is a motor control device is cooled down by the second cooling system 9 provided separately from the first cooling system. Specifically, the cooling water flows into the inverter 8 by driving the water pump 11, as shown in FIGS. 1 and 2, and cools down the inside thereof. The cooling water is then decreased in temperature by the radiator 12 and circulates into the water pump 11 again.

As described above, in the cooling structure of the motor-assist device for a vehicle according to the present invention, the motor-assist device for a vehicle is provided with the first cooling system in which the cooling water circulates through the engine, the motor housing, the heat exchanger, the water pump, and the engine again. Accordingly, when the water filling the cooling path of the first cooling system is allowed to circulate by the water pump, the motor housing can be cooled down.

Also, since the motor control device connected to the motor, that is the inverter, is mounted in the rear of the vehicle, and the second cooling system for cooling the inverter is provided separately from the first cooling system, the size of the second cooling system can be determined based on the heat generated only in the inverter. Thus, a compact and lightweight second cooling system can be provided.

According to the present invention, since the radiator forming the second cooling system is secured to the high-strength suspension system of the vehicle, there is no need to provide another mounting member for mounting the radiator, thus reducing the number of parts and the number of assembly processes.

According to the present invention, the radiator is secured to the lateral rod brace having a U-like configuration in cross section, thus eliminating the need for a high-strength bracket for retaining the radiator. Accordingly, a bracket with a simple structure can be manufactured at low cost, thus decreasing the weight of the bracket and reducing the cost for manufacture.

Also, the radiator is mounted at the vehicle-body side of the lateral rod brace, thereby decreasing the length of the pipe which connects the radiator with the other cooling members (such as water pump or the like) mounted in the vehicle body. Accordingly, a lightweight device having a simple system (piping structure) can be achieved.

In the present invention, most of the radiator is covered with the rear bumper, thereby protecting the radiator from external factors (bouncing stones, external forces applied from the rear of the vehicle, or the like).

In the present invention, the opening is provided at a part of the rear bumper, which covers the radiator, so that the performance of the radiator and the cooling performance of the entire system can be improved. Also, since the opening is provided with the mesh, the radiator can be protected.

What is claimed is:

1. A cooling structure of a motor-assist device for a vehicle in which a motor housing including a motor connected to a motor control device is disposed in a front of the vehicle in which an engine is mounted, and in which the motor-assist device for the vehicle is cooled by a first cooling system, the first cooling system comprises:

a cooling path formed in the motor housing;

a heat exchanger disposed in the front of the vehicle; and a water pump driven by the engine;

wherein an inlet of the cooling path is connected with the heat exchanger, and the heat exchanger is connected with the water pump; and wherein the motor control device connecting to the motor disposed in the front of the vehicle is mounted in the rear of the vehicle and a second cooling system for cooling the motor control device is provided separately from the first cooling system, and a part of the second cooling system is disposed on an inside of a chamber of the vehicle and another part of the second cooling system is disposed on an outside of the chamber of the vehicle.

2. A cooling structure of a motor control device for a vehicle according to claim 1, wherein the second cooling system for cooling the motor control device comprises a water pump and a radiator secured to a suspension system of the vehicle.

3. A cooling structure of a motor control device for a vehicle according to claim 2, wherein the suspension system of the vehicle is a lateral rod brace.

4. A cooling structure of a motor control device for a vehicle according to claim 2, wherein a part of the radiator forming the second cooling system for cooling the motor control device is covered with a rear bumper, and the radiator area covered with the rear bumper is larger than the area that is not covered.

5. A cooling structure of a motor control device for a vehicle according to claim 4, wherein an opening is provided at a part of the rear bumper which covers the radiator, and wherein the opening is covered with a mesh.

\* \* \* \* \*